May 24, 1949. W. C. PARRISH 2,470,860
HEATER
Filed March 8, 1944 10 Sheets-Sheet 5

May 24, 1949.  W. C. PARRISH  2,470,860
HEATER
Filed March 8, 1944  10 Sheets-Sheet 7

May 24, 1949. W. C. PARRISH 2,470,860
HEATER
Filed March 8, 1944 10 Sheets-Sheet 10

Patented May 24, 1949

2,470,860

UNITED STATES PATENT OFFICE 2,470,860

HEATER

William C. Parrish, Park Ridge, Ill., assignor to Stewart-Warner Corporation, Chicago, Ill., a corporation of Virginia Application March 8, 1944, Serial No. 525,535

20 Claims. (Cl. 257—245)

My invention relates generally to heaters of the sealed combustion type, and more particularly to the arrangement of the combustion chamber and heat exchanger. This application discloses an improvement over my prior application Serial No. 490,162, filed June 9, 1943, now Patent No. 2,432,929 issued Dec. 16, 1947, the primary object of this invention being to produce a heater in which the distribution of heat throughout the combustion chamber and heat exchanger is more uniform, and in which the harmful concentration of heat upon particular parts is avoided.

A further object is to provide an improved heater having a heat exchanger in which the full area of the heat exchange surfaces is utilized, and a high degree of heat transfer efficiency is thus obtained.

A further object is to provide an improved heat exchanger of simplified construction, which may be economically manufactured, which is light in weight, and which is efficient in operation.

Other objects will appear from the following description, reference being had to the accompanying drawings, in which.

In general, the several modified forms of heaters and heat exchangers disclosed in this application, embody a combustion chamber communicating directly and freely with a central hollow cylindrical core of substantial diameter, this core having outlets at the end opposite the combustion chamber, or distributed lengthwise of the core, these outlets permitting the products of combustion to flow into a spiral passageway of width substantially equal to the length of the heat exchanger, and coiled in spaced relation around the central core, the spaces between the core and the successive turns of the spiral passageway forming spaces for the flow of ventilating air longitudinally of the heat exchanger, whereby the core and the walls of the spiral passageway will be surrounded by flowing ventilating air.

Figures 1, 3:
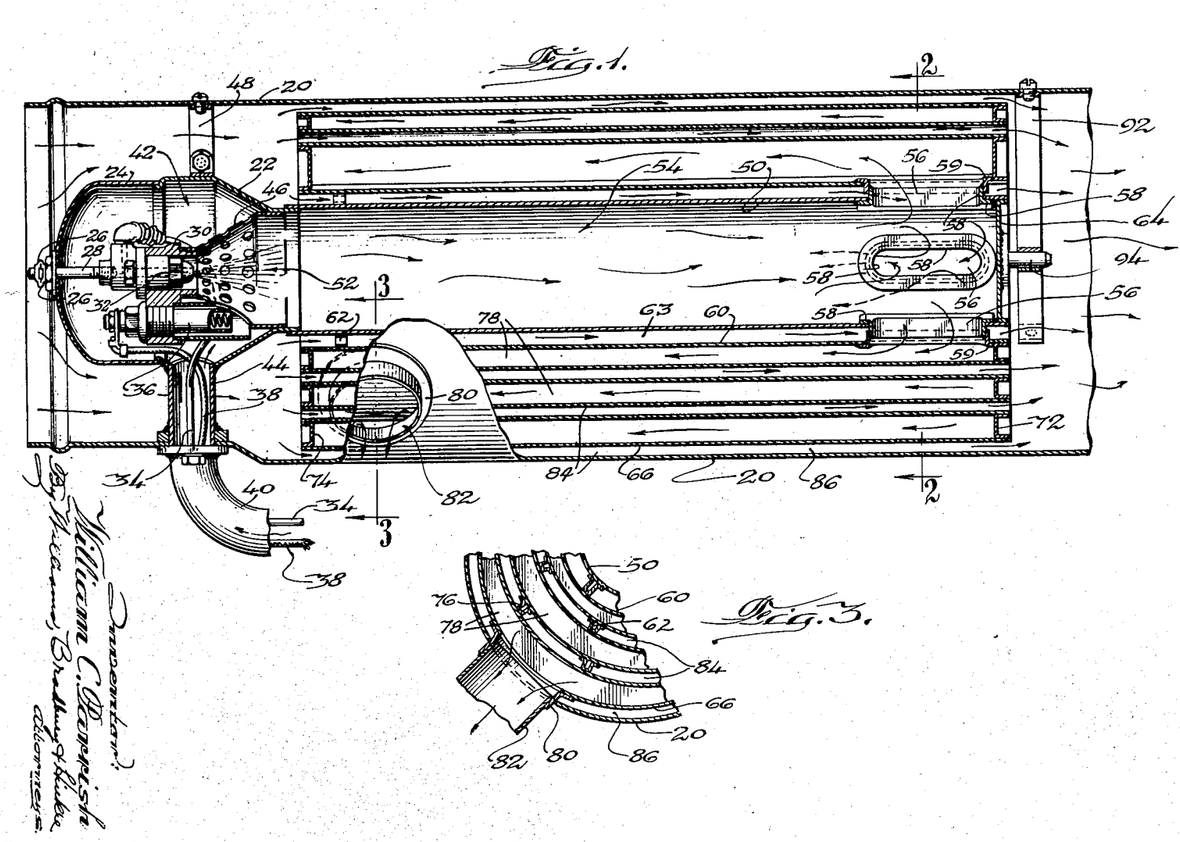
Fig. 1 is a central longitudinal sectional view of a heater and heat exchanger embodying the invention, taken on the line 1—1 of Fig. 2.
Fig. 3 is a fragmentary sectional view taken on the line 3—3 of Fig. 1.

As shown in Fig. 1, the heater comprises an external housing 20 which is generally cylindrical in shape, and has a combustion apparatus comprising an outer combustion chamber 22, the end of which is closed by a cap 24 secured by a lock nut 26 threaded on a stem 28. Within the outer casing 22 is a casting 30 within which a fuel spraying nozzle 32 is detachably secured, the nozzle being supplied with fuel through a tube 34. An electrical igniter 36, preferably of the hot resistance wire type, is secured in the casting 30 and is energized through a conductor 38 through the usual control circuits. Combustion air is supplied to the outer combustion chamber 22 through a conduit 40 which communicates with the plenum chamber 42 formed within the outer casing 22 by means of an extension 44. Within the casing 22 is a perforated conical baffle 46, the small diameter end of which is secured to the casting 30, and the other end of which fits snugly within the reduced diameter portion of the casing 22. The casing 22 and parts contained therein are supported within the external housing 20 by a plurality of brackets 48.

Air under pressure from a suitable source, such as a ram or scoop on the aircraft in which the heater is mounted, or from a blower, is supplied to the conduit 40 as well as to the left-hand (Fig. 1) end of the housing 20, or there may be separate sources of ventilating and combustion air.

A central hollow cylindrical heat exchanger core 50 is secured to the reduced diameter end of the outer housing 20 and forms, in effect, an extension of the combustion chamber 52. The space 54 within the core 50 is of sufficiently large diameter that the high temperature burning gases and products of combustion flow longitudinally thereof in the direction of the arrows at a moderate velocity, thereby maintaining a moderate rate of heat transfer to the core wall 50. Near the outlet end of the core 50 there are a plurality of discharge ports 56 formed in flanged connections 58 and 59. The connectors 59 are secured as by welding in a cylindrical sheet 60 surrounding and concentric with the core sheet 50. Suitable separator channels 62 extend longitudinally between the core 50 and sheet 60, mechanically to reinforce these elements and to hold them in suitably spaced relation, these separators being tack welded at suitable intervals to the core 50.

In assembling the connectors 58 and 59 and sheet 60 on the core 50, the flanged connectors 58 are first inserted and welded in position. Thereafter the sheet 60 is placed around the core 50 and the flanged connectors 59 then inserted and welded to the sheet 60 as well as to the connectors 58, thereby to provide fluid-tight sealed passageways. After the sheet 60 is assembled around the core 50, a flanged end plate 64 is welded in place. The spaces 63, in the aggregate annular in cross section, form passageways for the flow of ventilating air.

Figure 2:
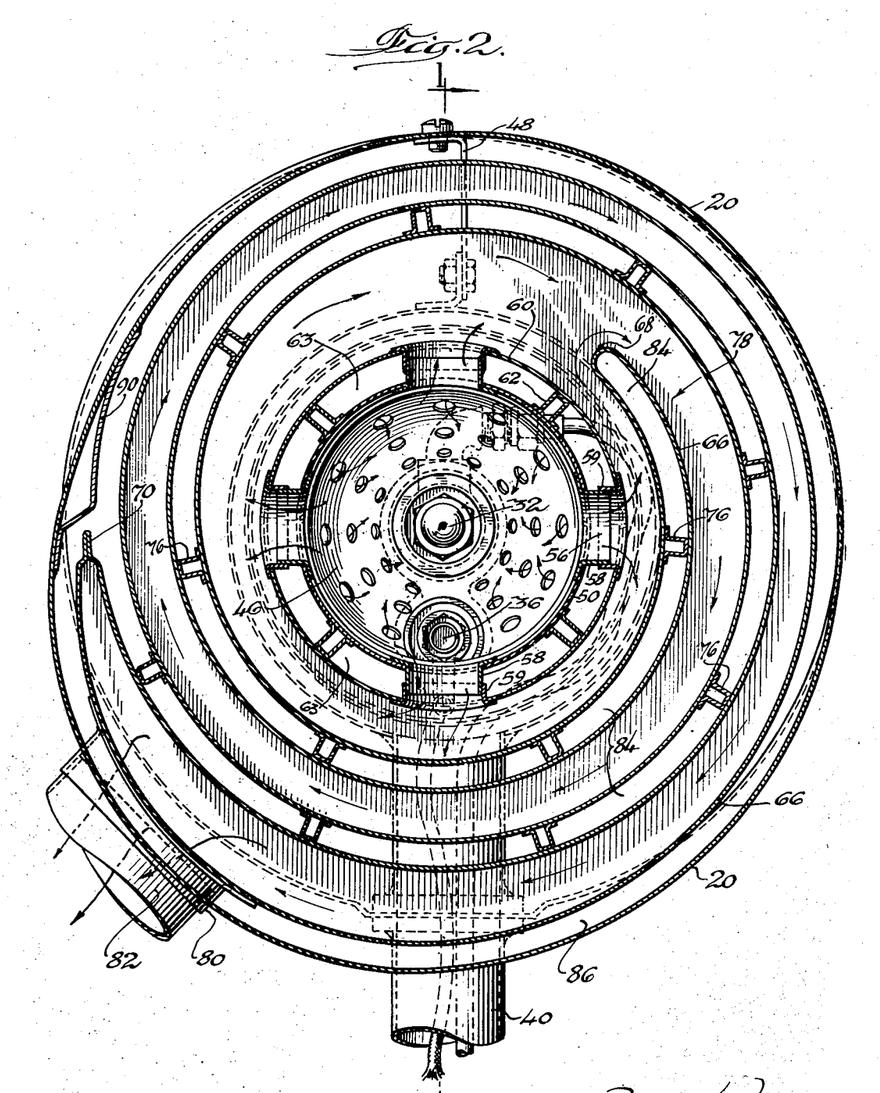
Fig. 2 is a transverse sectional view thereof, taken on the line 2—2 of Fig. 1.

A double spiral sheet 66 folded back upon itself to form a bend 68 is wrapped spirally around the cylindrical sheet 60 and has its ends welded together at a joint 70, the inner wall of the spiral form being somewhat shorter than the outer wall. The edges of the sheets are supported, and the passageway for the products of combustion formed between them closed, by an outlet end head 72 and an inlet end head 74. At suitable intervals the two portions of the double spiral sheet are held in spaced relation by channels 76 welded to the inner portion. The sheet 66 thus forms a spiral passageway 78 extending from the space surrounding the cylindrical sheet 60 to an exhaust fitting 80 which is welded to the outer portion of the sheet 66 adjacent the combustion chamber end of the heat exchanger. The products of combustion may be exhausted to the atmosphere through a conduit 82 connected to the fitting 80. The spaces between the adjacent portions of the sheet 66, as separated by the channels 76, form a plurality of ventilating air passageways 84 extending longitudinally of the heat exchanger. As shown in Fig. 2, the two portions of the spirally formed sheet 66 are spaced so that the passageways 84 are of uniform width throughout the length of the spiral. If desired, however, this spacing could be varied, depending upon the particular fuel used and the rate of heat transfer required for a particular construction.

In constructing a heater of this type it is also possible to vary the spacing of the central core 50 with respect to the inner of the spiral passageway in order to accommodate for the different temperatures of the products of combustion from fuels of different heating values, or to accommodate for different desired heat outputs using the same fuel.

To assure proper distribution of the flow of ventilating air through the various passageways 84 and the annular passageway 86 formed between the outer turn of the spiral sheet 66 and the housing 20, a stamping 90 is secured to the housing 20 by spot welding or the like to form an obstruction in what would otherwise be a widened portion of the passageway 86.

The heat exchanger assembly is supported in the housing 20 by means of a three-armed bracket 92 which is secured to a headed pin 94 welded to the end plate 64.

In operation, upon supplying fuel and combustion air to the combustion chamber and upon energization of the igniter, combustion will take place within the combustion chamber 52 and also to an appreciable extent within the space 54 formed within the hollow core 50. Due to the fact that the flow through the core 50 is at a relatively low velocity, the core 50 will, as previously indicated, not be heated excessively but the products of combustion will flow to the outlets 56 and hence into the spiral passageway 78, continuing outwardly along this passageway to the outlet fitting 80. In their flow along the space 54, the products of combustion will, however, be cooled to a sufficient extent that upon their increase in velocity in flowing from the ports 56 and into the spiral passageway 78, they will not cause excessive localized heating of the spiral 66 against which the streams impinge.

It will be noted that the passageways 63 between the core 50 and cylindrical sheet 60 are of greater width than the similar ventilating air passageways 84 and 86. Thus, for a given drop in pressure across the heat exchanger the velocity of flow in the passageways 63 will be greater than that in the passageways 84 and 86. Consequently the rate of heat transfer from the walls 50 and 60 will also be proportionately greater, and thus more rapidly carry away the heat from the products of combustion in the place where they are at their highest temperature.

It will be noted that the spiral passageway 78 has a relatively great cross sectional area immediately surrounding the cylindrical sheet 60, and that the width of this passageway decreases gradually, except that the end portion thereof is again of increased thickness to provide a manifold-like structure to make allowances for the fact that a large proportion of the products of combustion must flow longitudinally of the heat exchanger toward the exhaust outlet 80. The reason for having the spiral passageway of generally decreasing width is to assure that the temperature of the sheet 66 will be uniform throughout and this is accomplished by virtue of the fact that the velocity of flow is increased by the reduction in width and compensation is thereby made for the reduction in temperature of the products of combustion as they flow outwardly through the spiral passageway 78.

Figure 4:
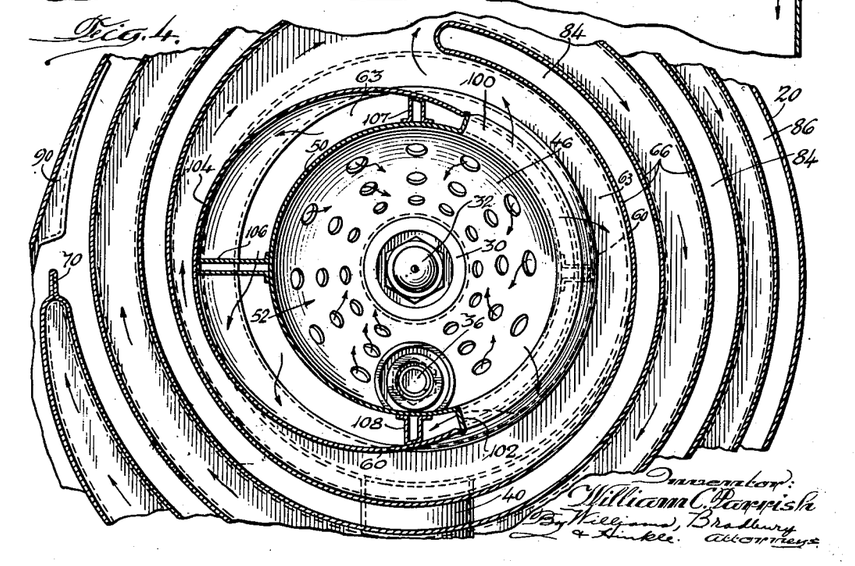
Fig. 4 is a fragmentary transverse sectional view taken on the line 4—4 of Fig. 5, and showing a modified form of the invention.
Figure 5:
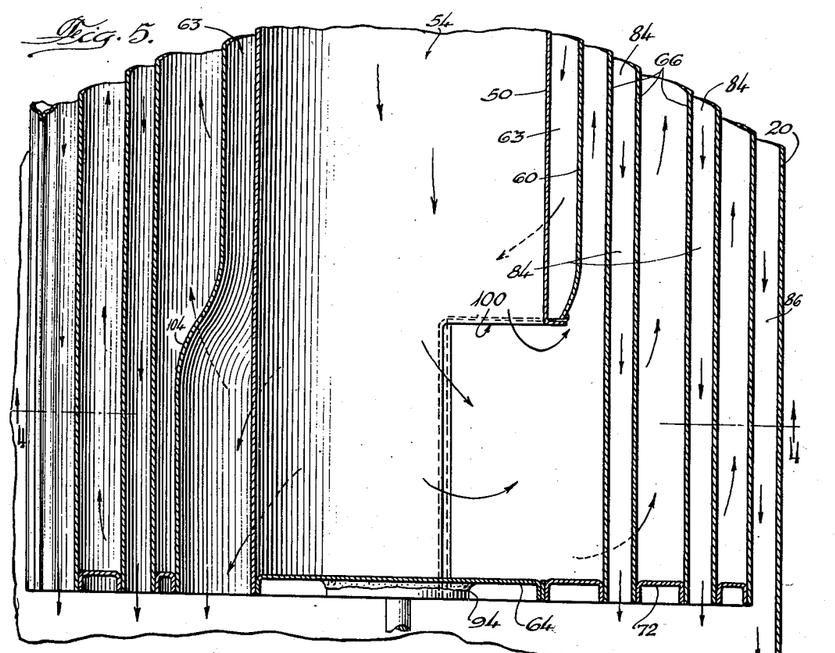
Fig. 5 is a fragmentary longitudinal sectional view of the outlet end portion of the modified heat exchanger of Fig. 4.

Figs. 4 and 5 disclose a modified form of the previously described construction, which is somewhat simplified, and thus may be manufactured more economically. All of the heater parts and most of the heat exchanger structure is identical with that previously described, and similar reference characters have therefore been applied to parts corresponding to those previously enumerated, and a description thereof will not be repeated.

It will be noted that the central core sheet 50 has a single outlet opening 100 which is formed by flanges 102 extending outwardly and welded to the sheet 60. In this embodiment the sheet 60 is deformed at its outlet end to provide a bulge 104 and thereby to increase the cross sectional area of the passageway 63 between the core 50 and the bulge 104 sufficiently to compensate for the reduction in cross sectional area of this passageway due to the obstruction provided by the flanges 102 surrounding the outlet opening 100. Spacing channels 106, 107, and 108 of appropriate different heights are provided to secure the deformed portion of the sheet 60 to the core 50. It will be observed that the operation of securing the sheet 60 to the core 50 is simplified, since but a single welding operation joining flanges 102 to the sheet 60 is required. The embodiment of Figs. 4 and 5 operates essentially in the manner described previously with reference to the embodiment of Figs. 1 to 3.

Figure 6:
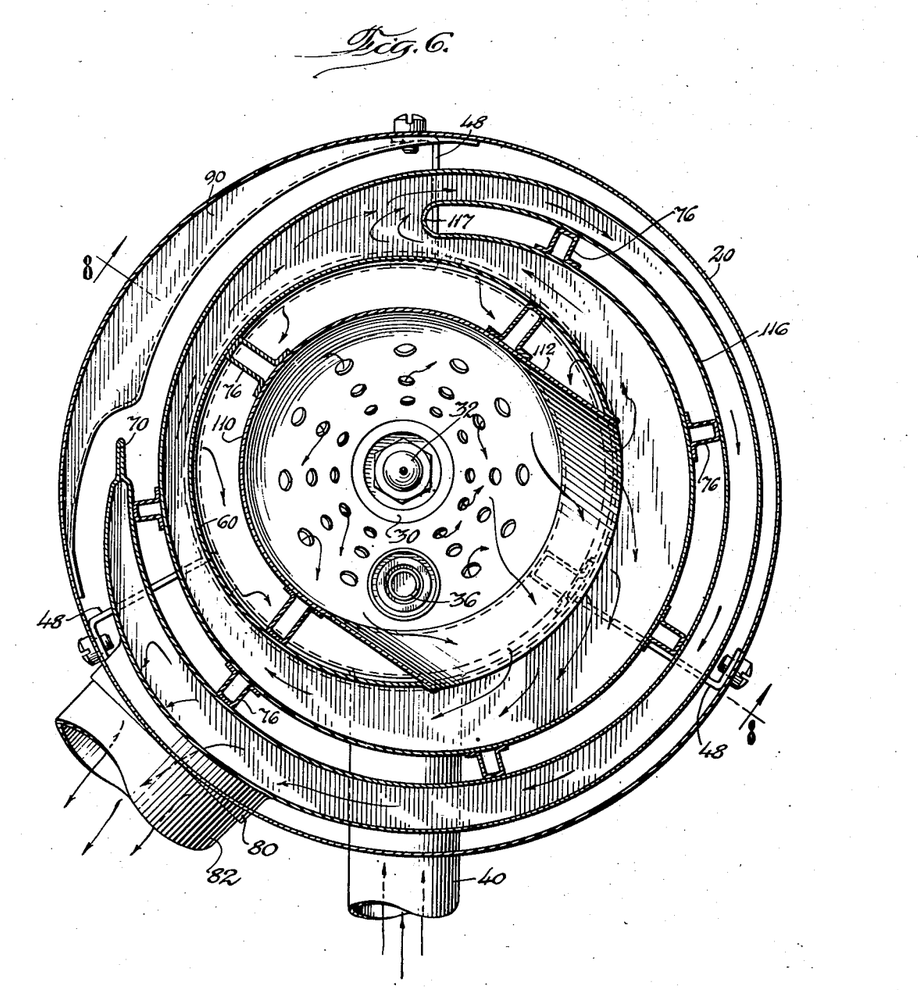
Fig. 6 is a transverse sectional view taken on the line 6—6 of Fig. 8, and illustrating a further modification of the invention.
Figure 8:
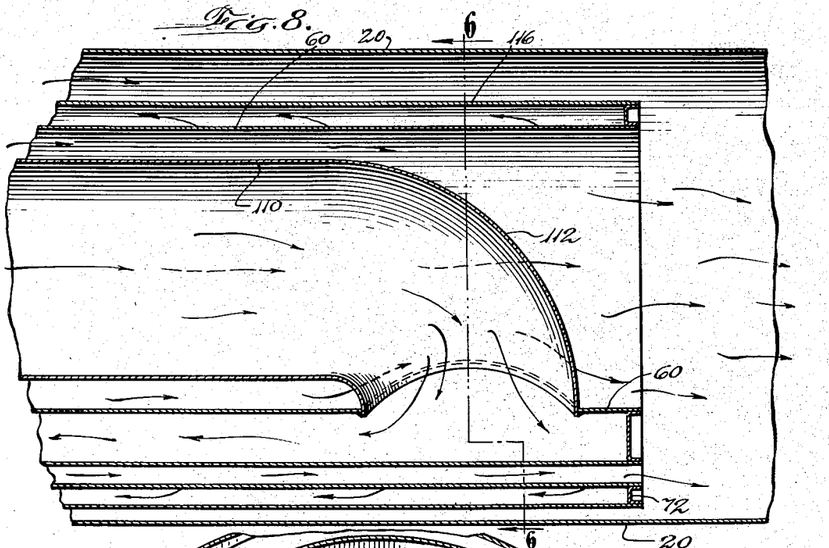
Fig. 8 is a fragmentary longitudinal sectional view of the outlet end portion of the heat exchanger, corresponding to the forms shown in Figs. 6 and 7, and taken on the line 8—8 of Figs. 6 and 7.

In the construction shown in Figs. 6 and 8, the hollow central cylindrical core 110 which corresponds in other respects to the core 50, has its outlet end portion formed with a bend 112 and has its ends welded to the suitably apertured cylindrical sheet 60. In this embodiment of the invention, the spiral sheet 116, which corresponds to the spiral sheet 66, is of lesser length than the embodiments of Figs. 1, 2, and 3.

In this embodiment of Figs. 6 and 8, the operation of constructing the heat exchanger is simplified by virtue of the bend 112 formed at the end of the core 110, and this construction also reduces exit losses of the products of combustion leaving the central core 110. In other respects the heat exchanger of Figs. 6 and 8 is substantially identical with that shown in Figs. 1 to 3, and it is therefore believed that further detailed description of this embodiment is unnecessary.

Figure 7:
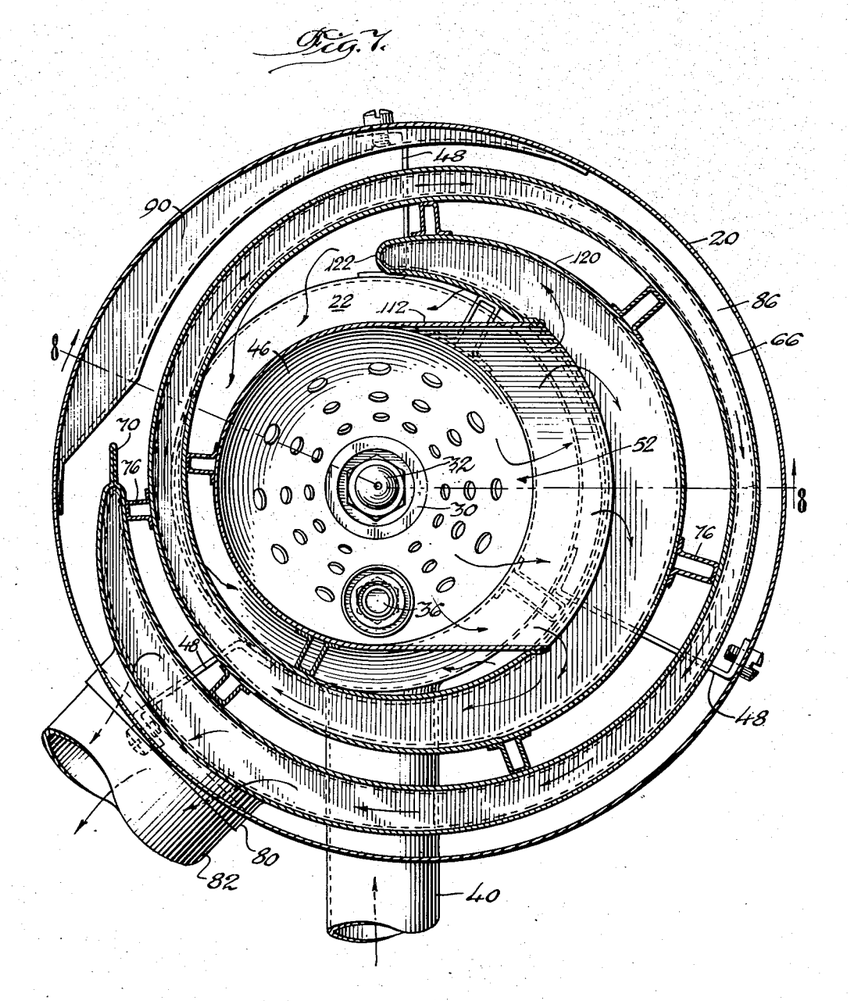
Fig. 7 is a transverse sectional view of a variant of the construction shown in Fig. 6.

The modified form of the invention shown in Fig. 7, differs but slightly from that shown in Fig. 6, and in fact, in longitudinal section is identical therewith, and Fig. 8 may therefore be considered as a sectional view of both Figs. 6 and 7.

In the construction of Fig. 7, the spiral sheet 120 has a closed end bend portion 122 so that the products of combustion flowing from the bend 112 into the spiral passageway are directed mainly in a clockwise direction from the outlet and only a very small proportion of the products of combustion will flow toward the bend portion 122. The latter portion will thus not be heated to excessively high temperatures, especially since it is entirely surrounded with cooling ventilating air. This construction thus differs from that of Fig. 6, because in the embodiment of Fig. 6, the product of combustion flow substantially equally in both directions from the outlet of the bend 112 as well as longitudinally thereof, and the bend 117 of the spiral sheet 116 is therefore scrubbed by the hot products of combustion and may be heated to a higher temperature than the remaining portions of the sheet. This possibility, which might be detrimental unless stainless steel sheet were used throughout the construction, is avoided in the embodiment of Fig. 7. By virtue of this modification of Fig. 7, the sheet 120 may have equivalent durability, but may be made thinner than the sheet 116 of Fig. 6, thereby reducing the overall weight of the heat exchanger and effecting an economy in manufacture.

Figure 9:
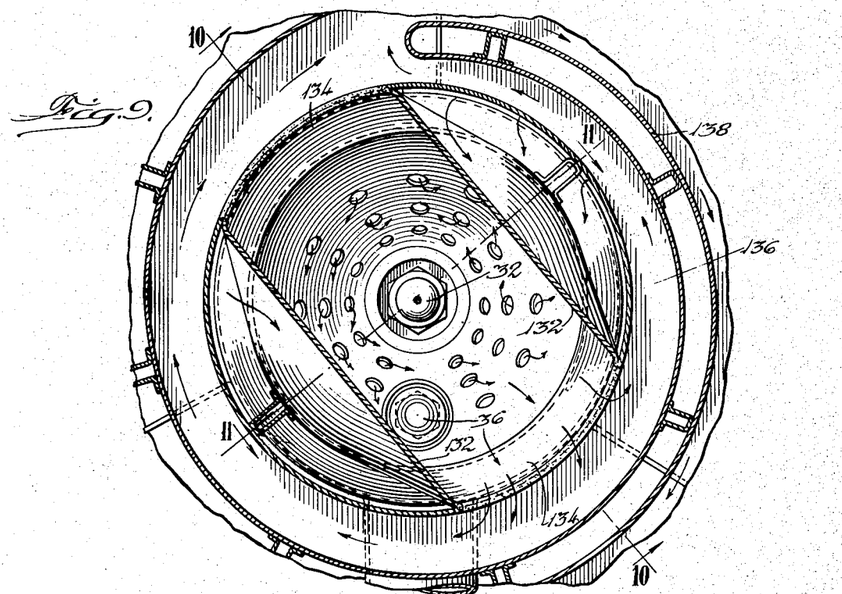
Fig. 9 is a fragmentary transverse sectional view of a modified form of heater, taken on the line 9—9 of Fig. 10.
Figure 10:
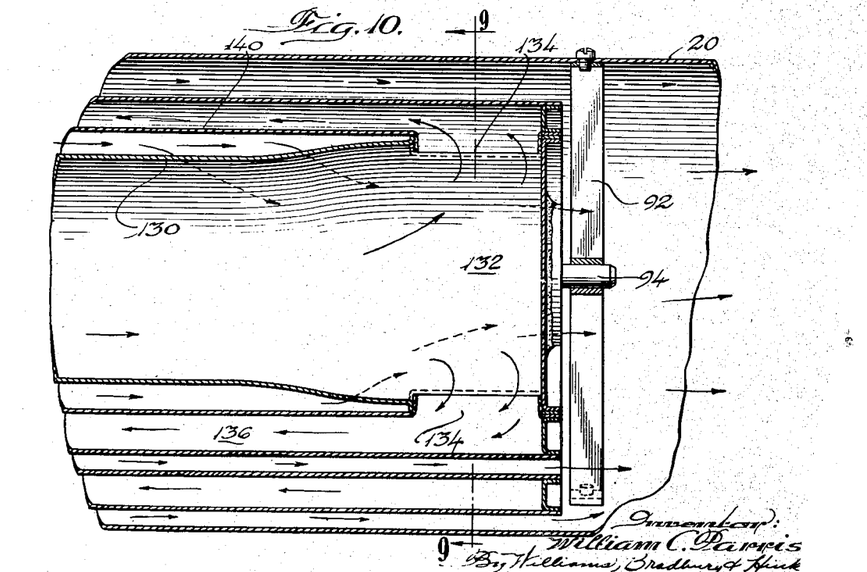
Fig. 10 is a fragmentary longitudinal sectional view taken on the line 10—10 of Fig. 9.
Figure 11:
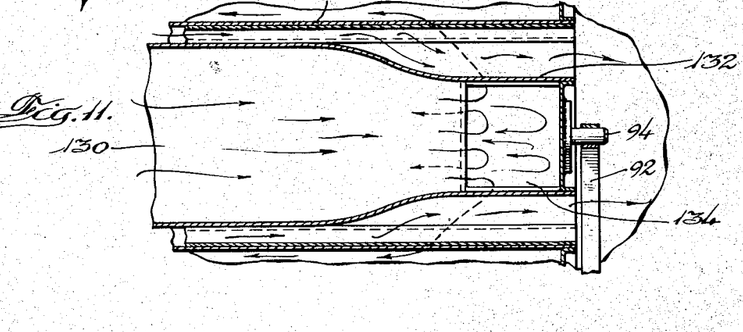
Fig. 11 is a fragmentary sectional view taken on the line 11—11 of Fig. 9.

In the embodiment shown in Figs. 9, 10,. and 11, the central core 130 has the end opposite the combustion chamber flattened to form generally plane sections 132, and is provided with a pair of diametrically opposite outlet openings 134. These outlet openings lead into the inner end of a spiral passageway 136, which is of shape generally similar to that shown in Fig. 6. By virtue of this arrangement, the outlet openings 134 from the central core are of relatively great cross sectional area, thereby reducing the exit velocity and precluding the possibility of impingement of a high velocity, high temperature products of combustion against the inner turn of the spiral sheet 138. Furthermore, this construction lends itself readily to quantity manufacture, in that the central core 130 may readily be conformed to the shape disclosed, and may be easily flanged and welded to the surrounding cylindrical sheet 140. Furthermore, due to the flattened shape of the end of the central hollow core 130, the air flow adjacent the outer surfaces of the flat portions 132 is symmetrical and of such pattern as to avoid local spaces of low velocity flow.

Figure 12:
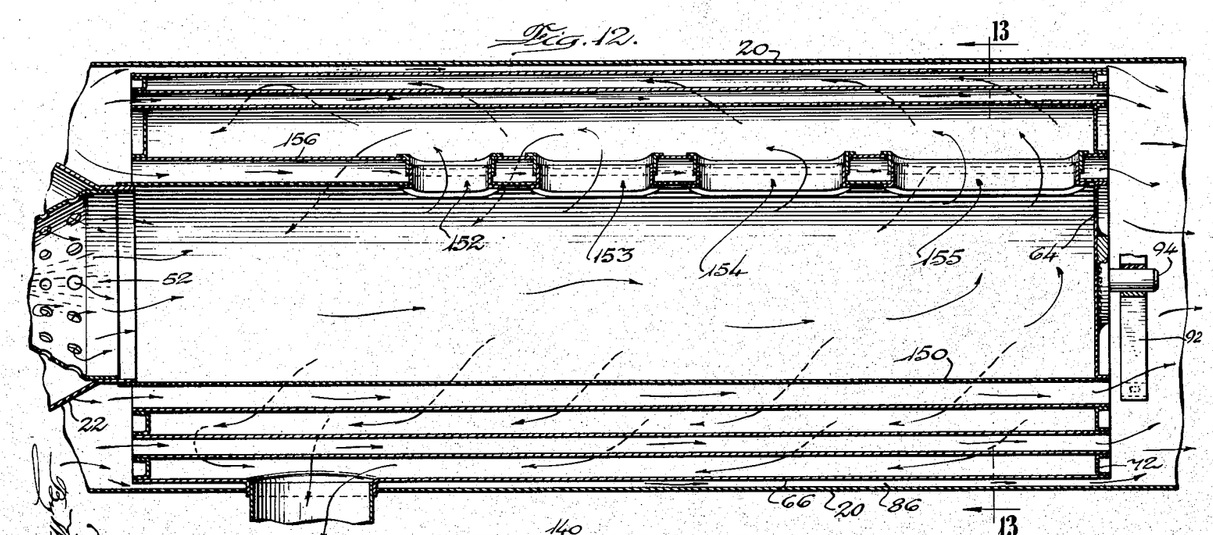
Fig. 12 is a central longitudinal sectional view of a further modified form of the invention, the section being taken on the line 12—12 of Fig. 13.
Figure 13:
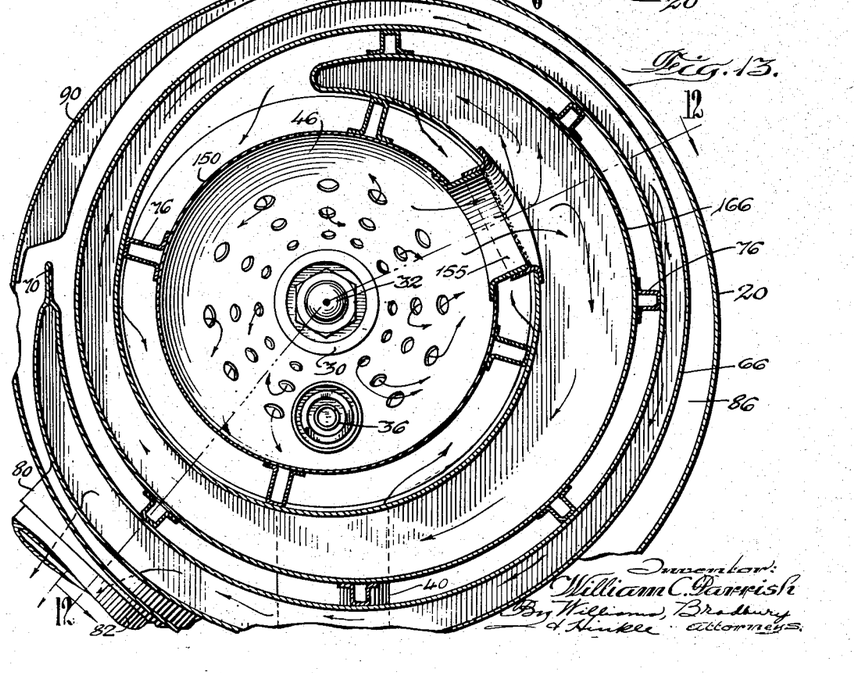
Fig. 13 is a transverse sectional view taken on the line 13—13 of Fig. 12.

In the embodiment of the invention shown in Figs. 12 and 13, the central hollow cylindrical core 150 is provided with a plurality of outlet openings 152, 153, 154, and 155, of generally elliptical shape and of successively increasing cross sectional area. These outlets are formed by suitable welded connecting fittings joining the core 150 with a cylindrical sheet 156 in a manner similar to that shown in Figs. 1 and 2.

As shown in Fig. 12, these openings 152—155 are in longitudinal alignment, but this is not essential since they may be arranged in any suitable staggered or irregular spacing circumferentially of the core 150.

The shape of the spiral sheet 166 is illustrated in Fig. 13 as being comparable with that of the spiral sheet 120 of Fig. 7, although, if desired, the spiral sheet arrangement may instead be similar to that shown in Fig. 6. In other respects the details of construction of the heater of Figs. 12 and 13 may be similar to those of the previously described embodiments.

The heater of Figs. 12 and 13 is particularly adapted for use with fuels of high heat output, or in which the heater is intended to be operated at extremely high capacities. It will be noted that the outlets 152 to 155 are of increasing cross sectional area, corresponding generally to the decreasing temperature and decreasing pressure of the products of combustion flowing longitudinally in the hollow casing 150. Thus there is obtained a comparatively uniform distribution of heat longitudinally along the inlet end of the spiral passageway.

Figure 14:
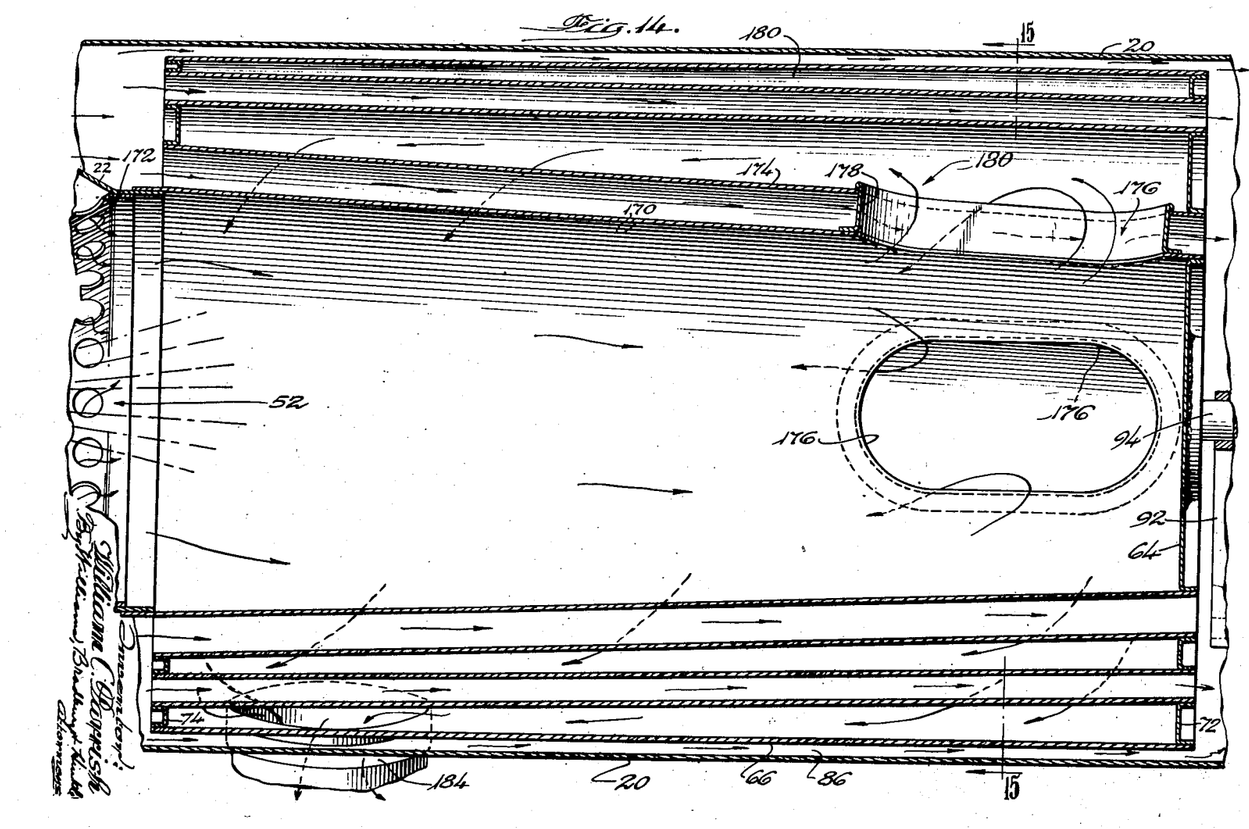
Fig. 14 is a longitudinal sectional view of the heat exchanger portion of a heater, taken on the line 14—14 of Fig. 15.
Figure 15:
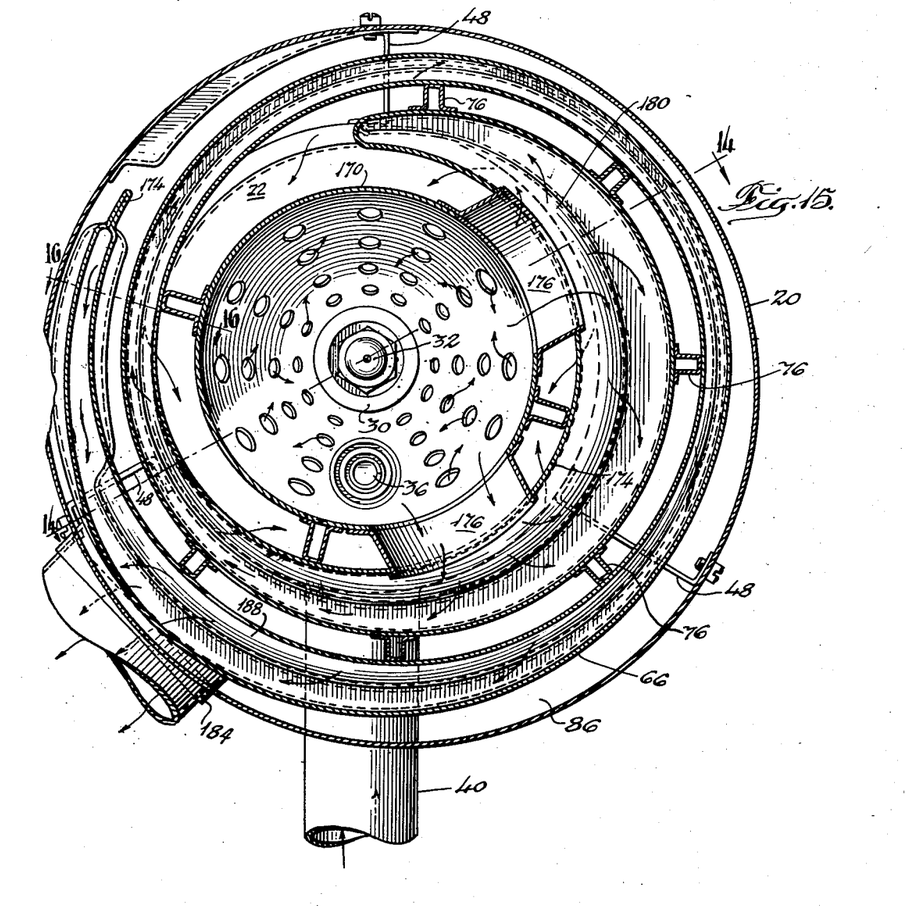
Fig. 15 is a transverse sectional view of the heater shown in Fig. 14, and taken on the line 15—15 of Fig. 14.
Figure 16:
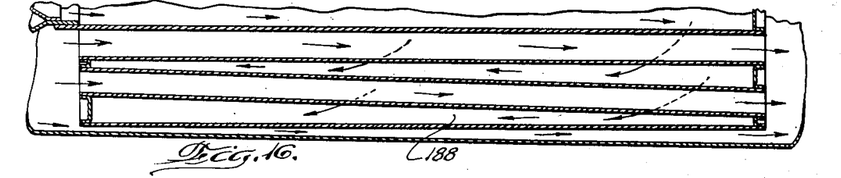
Fig. 16 is a fragmentary sectional view taken on the line 16—16 of Fig. 15.

In the embodiment shown in Figs. 14, 15, and 16, the central core 170 has its inlet end of substantially increased diameter, and tapers to a substantially lesser diameter at its outlet end, the outlet diameter being substantially the same as the diameters of the cylindrical cores in the previously described embodiments. As a result of this tapering construction of the core 170, the combustion chamber, as represented by the perforated generally conical baffle 172, may be made substantially larger than in the previously described embodiments. This increased size of the combustion chamber is conducive to improved combustion, especially in heaters used on aircraft wherein it is usually of great importance to maintain the overall dimensions of the heater as small as possible, and to obtain combustion of a large amount of fuel in this limited space.

The tapering shape of the core 170 results in substantially uniform rate of heat transfer to this shell, since as the temperature of the products of combustion flowing longitudinally of the core 170 decreases, the velocity of flow increases. The core 170 is surrounded by a tapered shell 174 uniformly spaced therefrom. A pair of outlet ports 176 is provided by flanged connectors 178 respectively welded to the core 170 and shell 174. Any other suitable arrangement of outlet ports, as illustrated in the previously described embodiments, might be utilized in place of the port arrangement shown.

The ports 176 lead into the inlet end of a spiral passageway 180 which surrounds the shell 174. The passageway 180 is of varying width considered along its spiral length as well as in a direction longitudinally of the heat exchanger. This variation in the width of the passageway 180 in a direction longitudinally of the heater is best shown in Fig. 14. The decrease in width of the passage 180 in a direction of the spiral is for the purpose, as previously described, of maintaining a constant metal temperature throughout the sheet 174. The decreasing width of the spiral passageway 180 in a direction longitudinally of the heat exchanger has for its purposes, (a) the allowance of the use of a larger combustion chamber, and (b) the promotion of uniform distribution of the flow of the products of combustion, that is, to maintain substantially uniform spiral flow throughout the length of the heat exchanger.

Since the flow of the products of combustion through the spiral passageway 180 is substantially uniform throughout the length of the heat exchanger, provision is made to collect and direct the products of combustion from the end of the spiral passageway into the outlet fitting 184. This means comprises an expansion of the outer extremity of the spiral passageway to provide an end manifold passageway 188 which tapers in width, as best shown in Fig. 15, in a direction opposite to the tapering of the remaining portion of the spiral passageway proper. The exit loss which would occur if this tapering expansion of the end of the spiral passageway were not provided would upset the balance of the pressure drop through the unit, and therefore destroy the uniform distribution of flow of the products of combustion outwardly through the spiral passageway 180.

It will also be noted that all of the ventilating air passageways are of uniform cross sectional area throughout their longitudinal dimensions, and that the outer housing 20 is of cylindrical shape.

It will be noted that in all of the embodiments of the invention, the central core tube in effect forms a continuation of the combustion chamber, that the flow of the burning mixture and products of combustion through this central tube will be at a relatively low velocity, and that in each embodiment the products of combustion flow radially outwardly from the central core tube through a spirally formed passageway. The spaces intermediate the turns of the spiral passageway form ventilating air passageways generally of uniform width, and extending longitudinally of the heat exchanger assembly. The various embodiments differ mainly in the form of the spiral passageway for the products of combustion, and in the ports or passageways by which the products of combustion flow from the central core tube into the innermost turn of the spiral passageway. While all of the forms of the invention disclosed are adapted for high rates of fuel consumption and consequent high rates of heat output, some of the embodiments are better adapted than others for extremely high rates of heat production. On the other hand, some embodiments are adapted for use with high heat output fuels, or are better adapted for low cost quantity production manufacture. The various modifications thus present a variety of forms of the invention from which may be selected the particular form best suited to a particular set of operating conditions which may be encountered in practice.

While I have shown and described particular embodiments of my invention, it will be apparent that numerous variations and modifications thereof may be made without departing from the underlying principles of the invention. I therefore desire, by the following claims, to include within the scope of my invention, all such variations and modifications by which substantially the results of my invention may be obtained through the use of substantially the same or equivalent means.

I claim:

1. In a hermetically sealed type heating apparatus for aircraft and the like having means forming a combustion chamber with a relatively large diameter outlet opening, a central core tube of substantially the same diameter as the outlet opening of said combustion chamber and forming a continuation thereof, means comprising sheet metal wrapped spirally about said core tube in spaced relation thereto and in two layers to form alternate passageways for the flow of products of combustion and ventilating air, said passageway for products of combustion being of enlarged cross-sectional area in the region of the inlet thereto and the outlet therefrom, means providing a connecting passageway between said core tube and the products of combustion passageway formed by said sheet metal, such connecting passageway leading from a part of said core remote from the combustion chamber, means to hold the turns of said sheets in spaced relation, and means to cause flow of ventilating air longitudinally through the ventilating air passageways between turns of said spiral sheet metal.

2. In a heater of the sealed combustion type having means forming a combustion chamber, the combination of a casing, a sheet metal tubular core of the same order of diameter as the maximum cross sectional dimension of the combustion chamber and secured to said combustion chamber forming means, the space within said core forming in effect a continuation of the combustion chamber and providing a passageway of relatively large cross sectional area, a sheet metal structure within said casing and surrounding said core, said sheet metal structure comprising sheet metal spirally wrapped about said core in spaced relation to said core and to itself to provide alternate longitudinally and spirally extending passageways respectively for the conduction of ventilating air and of products of combustion, said passageway for products of combustion being of enlarged cross-sectional area in the region of the inlet thereto and the outlet therefrom, means providing an opening of relatively large cross sectional area between said tubular core and the inner turn of the spiral passageway at a part of said core remote from said combustion chamber for conducting the products of combustion into said passageway after flowing through said core, exhaust conduit means connected to the outer turn of said spirally coiled sheets for conducting the products of combustion from the passageway formed thereby, and means for conducting ventilating air to be heated into the adjacent ends of said longitudinally extending passageways.

3. The combination set forth in claim 2, in which there are a plurality of spacers extending longitudinally through said air passageway, and in which the edges of said spirally formed sheet metal are joined to one another by spirally flanged heads.

4. The combination set forth in claim 2, in which the innermost turn of said spirally formed sheet metal is spaced from said tubular core, and in which the means providing an opening of relatively large cross sectional area comprises a pair of joined flanged connectors respectively welded to said innermost turn of the spirally formed sheet metal and to said tubular core.

5. The combination set forth in claim 2, in which the means providing an opening of large cross sectional area is located near the end of said tubular core opposite said combustion chamber and in which said exhaust conduit means is connected to the passageway for conducting the products of combustion near the end thereof adjacent said combustion chamber.

6. The combination set forth in claim 2, in which the means providing an opening of relatively large cross sectional area comprises a plurality of ported connectors extending radially from said tubular core near the end thereof opposite the combustion chamber.

7. The combination set forth in claim 2, in which the means forming the opening between said tubular core and the inner turn of the passageway for the products of combustion comprises a plurality of connectors spaced different distances from the combustion chamber and having apertures of progressively increasing size as their distance from the combustion chamber end of said tubular core is greater.

8. The combination set forth in claim 2, in which the means forming the opening between said tubular core and the inner turn of the passageway for the products of combustion comprises a plurality of connectors spaced different distances from the combustion chamber.

9. The combination set forth in claim 2, in which a cylindrical sheet surrounds said tubular core and is spaced therefrom to provide a ventilating air passageway, and in which the end of said tubular core opposite the combustion chamber has opposed flat sides and apertured intermediate portions of increased diameter secured to said cylindrical sheet.

10. The combination set forth in claim 2, in which the spiral passageway for conducting the products of combustion has an inner closed end, and in which the means providing the opening between the tubular core and said passageway is spaced a substantial distance from said closed end to reduce the velocity of flow of the products of combustion along said closed end.

11. The combination set forth in claim 2, in which said tubular core has an elbow bend at the end thereof opposite the combustion chamber, and in which said elbow bend forms said means providing an opening of relatively large cross sectional area.

12. The combination set forth in claim 2, in which the means providing an opening of relatively large cross sectional area comprises a flanged joint at the end of said tubular core opposite said combustion chamber, said joint connecting said tubular core and the innermost turn of said spiral metal sheet, and in which said innermost turn has a radial outward bulge diametrically opposite said joint, whereby the cross sectional area of that portion of the ventilating air passageway immediately surrounding said tubular core is not appreciably reduced because of the presence of said joint.

13. The combination set forth in claim 2, in which said sheet metal structure comprises a sheet turned back upon itself at the inner end of the spiral, and in which an air passageway is formed between the portions of the sheet at the place at which the sheet is turned back upon itself.

14. The combination set forth in claim 2, in which said sheet metal structure comprises a sheet turned back upon itself at the inner end of the spiral and in which the innermost turn of said sheet is spaced from said tubular core to provide an air passageway between said core and the spiral structure.

15. In a heater of the sealed combustion type having means forming a combustion chamber, a sheet metal core forming an extension of the combustion chamber forming means and receiving the products of combustion therefrom, said core being tapered and having its smaller cross sectional area at the end thereof opposite said combustion chamber, a sheet metal structure surrounding said core, said structure including sheet metal spirally wrapped around said core in spaced relation to form longitudinal and spiral passageways respectively for ventilating air and for products of combustion, the passageway for the products of combustion being of decreasing breadth in the direction of the spiral outward flow of the products of combustion and in the direction from the far end to the end adjacent the combustion chamber, means connecting the far end of said core to the inner end of said passageway for the products of combustion, and means for making an exhaust conduit connection to the outer end of said last named passageway.

16. The combination set forth in claim 15, in which said means connecting said core to the inner end of said passageway for the products of combustion comprises a plurality of flanged connectors respectively welded to said core and the sheet forming the inner wall of said passageway, and in which said connectors extend across a portion of the ventilating air passageway which immediately surrounds said core.

17. The combination set forth in claim 15, in which said spirally wrapped sheet metal has the portions thereof which form the ventilating air passageway spaced apart uniformly to form a ventilating air passageway of uniform cross sectional area throughout its length.

18. The combination set forth in claim 15, in which said spirally wrapped sheet metal has the portions thereof forming the outer end part of the passageway for the products of combustion deformed to form a section of increased breadth leading to said means for making the exhaust conduit connection.

19. The combination set forth in claim 2, in which said sheet metal structure comprises a sheet turned back upon itself at the inner end of the spiral, and in which the innermost turn of said sheet is spaced from said tubular core to provide a passageway between said core and the spiral structure.

20. The combination set forth in claim 2, in which the end of said tubular core opposite the combustion chamber has opposed flat sides and apertured intermediate portions for establishing communication between said core and the inner turn of the passageway for products of combustion.

WILLIAM C. PARRISH.

REFERENCES CITED

The following references are of record in the file of this patent:

UNITED STATES PATENTS

| Number | Name | Date |
|---|---|---|
| 605,329 | Neal | June 7, 1898 |
| 870,821 | Hall | Nov. 12, 1907 |
| 1,056,932 | Olson et al. | Mar. 25, 1913 |
| 2,263,098 | Mueller | Nov. 18, 1941 |

FOREIGN PATENTS

| Number | Country | Date |
|---|---|---|
| 56,776 | Switzerland | July 14, 1911 |
| 146,950 | Switzerland | July 16, 1931 |